United States Patent [19]
Shimizu et al.

[11] Patent Number: 5,242,731
[45] Date of Patent: Sep. 7, 1993

[54] RESIN COMPOSITION FOR AN OPTICAL DISC AND AN OPTICAL DISC USING IT

[75] Inventors: Seizaburo Shimizu; Shigeru Matake, both of Yokohama, Japan

[73] Assignee: Kabushiki Kaisha Toshiba, Kawasaki, Japan

[21] Appl. No.: 676,544

[22] Filed: Mar. 28, 1991

[30] Foreign Application Priority Data

| Mar. 29, 1990 | [JP] | Japan | 2-78814 |
| Mar. 29, 1990 | [JP] | Japan | 2-78815 |
| Mar. 29, 1990 | [JP] | Japan | 2-78817 |
| Mar. 29, 1990 | [JP] | Japan | 2-78820 |

[51] Int. Cl.$^5$ ............................................. B32B 3/00
[52] U.S. Cl. ........................................ 428/64; 428/65; 428/446; 428/447; 428/913; 346/76 L; 346/135.1; 450/975
[58] Field of Search ............... 428/64, 65, 446, 447, 428/913; 346/76 L, 135.1

[56] References Cited

U.S. PATENT DOCUMENTS 5,024,893 6/1991 Hanada et al. .................. 428/423.1

FOREIGN PATENT DOCUMENTS

| 0405898 | 1/1991 | European Pat. Off. . |
| 0408763 | 1/1991 | European Pat. Off. . |
| 51-140601 | 12/1976 | Japan . |
| 55-4793 | 1/1980 | Japan . |
| 1-232552 | 9/1989 | Japan . |

OTHER PUBLICATIONS

World Patents Index Latest Week 9008, Derwent Publs. Ltd., London, GB; AN 90054376 & JP-A-02 007 246 (New Nippon Elec. K.K.) Jan. 11, 1990.

World Patents Index Latest Week 8829, Derwent Publs. Ltd., London, GB; AN 88-201513 & JP-A-63 138 740 (Canon K.K.) Jun. 10, 1988.

Primary Examiner—Patrick J. Ryan
Assistant Examiner—Elizabeth Evans
Attorney, Agent, or Firm—Oblon, Spivak, McClelland, Maier & Neustadt

[57] ABSTRACT

An optical disc having a transparent substrate, a resin layer comprised of a silicon resin and a curing catalyst, a projection/recess pattern formed on the transparent substrate, and a recording layer formed on the resin layer.

8 Claims, 4 Drawing Sheets

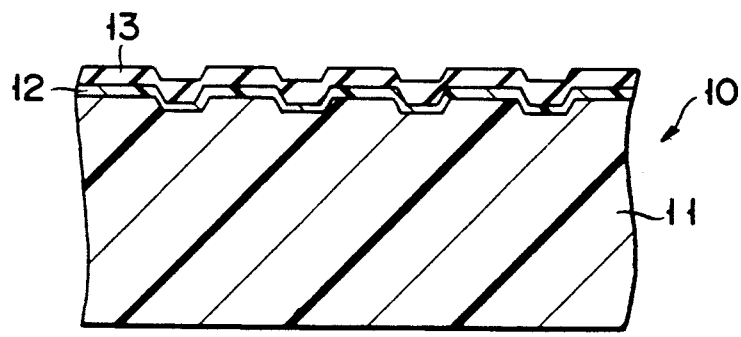
F I G. 1A
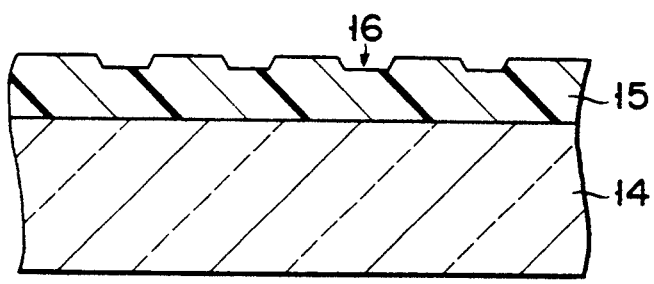
F I G. 1B
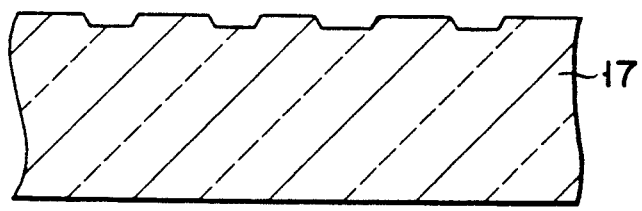
F I G. 1C

F I G. 3F 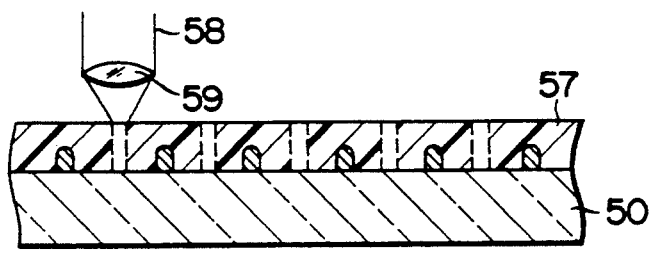
F I G. 3G 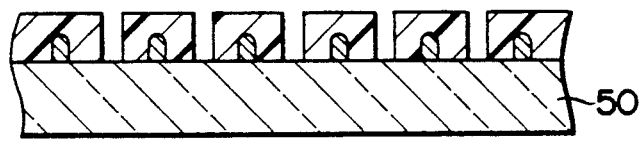
F I G. 3H 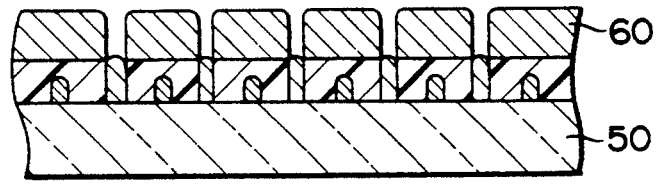
F I G. 3I 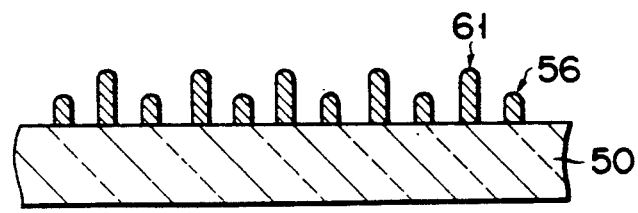

RESIN COMPOSITION FOR AN OPTICAL DISC AND AN OPTICAL DISC USING IT

BACKGROUND OF THE INVENTION

1. Field of the Invention

The present invention relates to a resin composition for an optical disc for use in information recording, etc., and an optical disc using it.

2. Description of the Related Art

As a material for a substrate of a conventional optical recording medium (optical disc), use is made of glass, acrylic resin, polycarbonate resin, epoxy resin, polyolefinic resin, etc.

Generally, an optical disc comprises a substrate with optical guide grooves, pits, etc., for achieving a higher density recording and an underlying layer, recording layer, reflective layer, etc., formed over the substrate.

The substrate as set out above is usually prepared by the following four methods.

The first method comprises injecting a melting resin into a mold equipped with a stamper having projection spots corresponding to the shape of guide grooves and solidifying it. As a resin using this method, use is made of a thermoplastic resin, such as an acrylic resin, polycarbonate resin and polyolefinic resin.

The first method is excellent in quantity production, but presents the following problems.

An optical disc 10 as produced by the first method shown in FIG. 1A has a birefringence as its optical characteristic varied nonuniformly and undergoes a deformation in a substrate 11 originating from the nonuniform thickness of the substrate and an axial runout in a surface of the substrate. Further, due to the gas permeability and hygroscopicity of the resin per se, an underlying layer 12 and recording layer 13 are deteriorated and a deformation in the substrate 11 occur. When, for example, the underlying layer 12 and recording layer 13 are to be formed by sputtering over the substrate, the substrate 11 is softened owing to the low heat-resistance of these resins used and suffers a drop in an adhesion between the substrate 11 and the underlying layer 12. As a result, the recording layer 13 on the underlying layer 12 wrinkles or cracks. Further, as these resins usually contain an internal mold release agent so as to improve a separation from a stamper, the substrate 11 and underlying layer 12 are lowered in their adhesion. The use of the first method requires a very large equipment.

The second method known as a so-called 2P method comprises, as shown in FIG. 1B, placing a stamper and transparent substrate, comprised of glass or transparent resin, in a mold at a predetermined interval, casting an ultraviolet radiation-curing type resin into a spacing between the stamper and the transparent substrate, emitting an ultraviolet radiation onto the resin through the transparent substrate 14 to allow the resin to be joined to the substrate by causing the resin to cure, and then forming guide grooves or pits 16 on the cured resin 15. In this method, an acrylic resin, epoxy resin, etc., are employed as the ultraviolet radiation curing type resin.

The 2P method is inferior to the injection molding method in quantity production. Since, according to this method, an unreacted low molecular component, such as a monomer, is left at the unexposed portions of the ultraviolet radiation curing type resin, it is necessary to remove them by washing. The unreacted component is left unremoved even if washing is done. In the formation of the recording layer by sputtering on the substrate, the unreacted resin component and the substance having low molecular weight are evaporated, hindering the formation of the recording layer and hence taking lots of time in its formation. The evaporated unreacted resin component and low molecular weight substance are deposited on the inner surface of the equipment and frequent maintenances have to be done in the equipment. For a cured resin of lower heat resistance, the recording layer wrinkles or cracks as in the first method. The substrate as manufactured by the 2P method, by forming a film carefully, prevents a wrinkle or a crack on the recording layer, but the recording layer wrinkles or cracks upon a passage of a longer period of time.

The third method comprises setting a stamper having a predetermined projection pattern in a mold, casting a reactive resin, such as an epoxy resin, into a cavity of the mold and curing it through a reaction.

In this casting method, it takes a longer time to achieve a curing step so as to prevent a drop in optical characteristic originating from an internal deformation caused upon the reaction of the reactive resin. The method is not better in quantity production. In order to improve a separation from the stamper, etc., a drop in a polar group in the resin and addition of an internal mold release agent to the resin are accomplished, lowering an adhesion between a substrate and a recording layer. The resin, being of a lower heat resistance type, wrinkles or cracks in the recording layer as in the preceding method.

The fourth method comprises forming a resist layer on the surface of a glass substrate, either recording information in the form of grooves and pits directly on the resist layer or forming a resist layer on the surface of a glass substrate 17 as shown in FIG. 1C, exposing the resist layer using a mask, developing it and eliminating those resist layer portions corresponding to the grooves and pits, and etching the glass with the resist layer used as a mask to provide grooves and pits 18 directly on the glass substrate.

The fourth method can obtain a substrate of an excellent characteristic, but it involves a complex manufacturing process and lower quantity production.

If an optical disc substrate is manufactured by the forementioned method with the use of a conventional resin composition, a crack or a wrinkle occurs on the surface of the recording layer overlying the substrate, lowering the recording characteristic of an optical disc obtained. A substrate, even if exhibiting an excellent recording characteristic, results in a lowered quantity production.

SUMMARY OF THE INVENTION

It is accordingly the object of the present invention to provide a resin composition for an optical disc which suffers neither a wrinkle nor a crack on the surface of a recording layer formed and assures a quantity production and an optical disc substrate of an excellent optical characteristic.

According to the present invention, there is provided a resin composition for an optical disc, which comprises (A) a silicone resin consisting of 5 to 15 molar percent of a first component represented by a formula

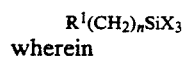

wherein $R^1$: a functional group selected from the group consisting of a vinyl group, 1,3,dibutadienyl group, glycidoxy group and methacryloxy group;

X : a functional group selected from the group consisting of a halogen, hydroxyl group, isocyanate group and alkoxy group having below 6 carbon atoms; and n : 0 to 5, 30 to 50 molar percent of a second component represented by a formula $$R^2SiY_3$$

wherein $R^2$: a phenyl group or a methyl group; and

Y : a functional group selected from the group consisting of a halogen, isocyanate group and alkoxy group having below 6 carbon atoms, and 45 to 60 molar percent in a siloxy unit of a third component represented by:

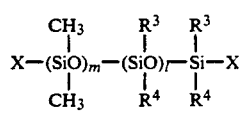

wherein $R^3$, $R^4$: a functional group selected from the group consisting of a methyl group, ethyl group, vinyl group, 1,3-dibutadienyl group, glycidoxy group, methacryloxy group and phenyl group;

X : a functional group selected from the group consisting of a halogen, hydroxy group, isocyanate group and alkoxy group having below 6 carbon atoms, m : 4 to 100; and l : 0 to 10;

and (B) curing catalyst.

According to another aspect of the present invention, there is provided an optical disc comprising a transparent substrate, a resin layer, having a projection/recess pattern, comprised of the aforementioned resin composition and formed on the transparent substrate, and a recording layer formed on the resin composition layer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1A to 1C are an explanatory view showing the manufacture of a conventional optical disc;

FIGS. 3A to 3I show the process of manufacturing a stamper for use in the manufacture of an optical disc substrate.

DETAILED DESCRIPTION OF THE PREFERRED EMBODIMENT

Figure 2:
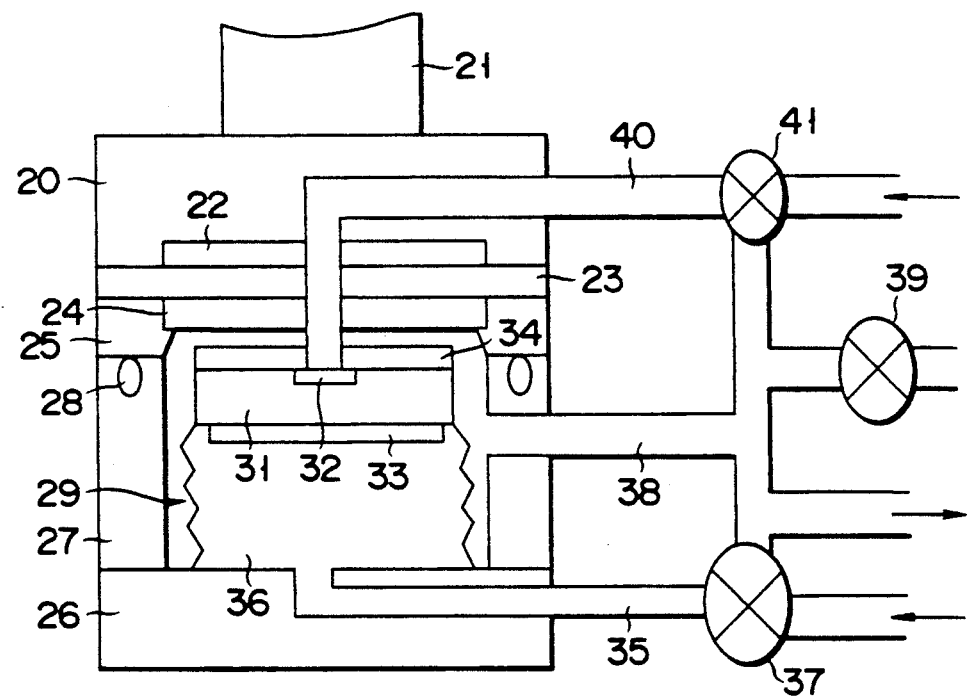
FIG. 2 is a diagrammatic view showing an apparatus for manufacturing an optical disc substrate.

The present invention will be explained below in connection with an embodiment.

The content of $R^1(CH_2)_nSiX_3$ in a first component of a silicone resin of a resin composition of the present invention is set to be 5 to 15 molar %. For less than 5 molar % of the first component, a cured resin composition layer formed on the transparent substrate becomes softened while, for the content of the first component exceeding 15 molar %, a cured resin composition layer formed on the transparent substrate becomes hard and brittle. It is, therefore, not possible in either case to form a desirable pit pattern on the cured resin composition layer. The content of the first component is preferably in a range of 9 to 12 molar %.

In a formula $R^1(CH_2)_nSiX_3$, $R^1$ is a function group selected from the group consisting of a vinyl group, 1,3-dibutadienyl group, glycidoxy group and methacryloxy group;

X is a functional group selected from the group consisting of a halogen, a hydroxy group, isocyanate group and alkoxy group having below 6 carbon atoms; and n is 0 to 5.

An ethoxy group, methoxy group or isopropoxy group can be used as the alkoxy group having below 6 carbon atoms. Of the chemical formula, vinyltriethoxysilane is preferable where $R^1$ represents a vinyl group; X, an ethoxy group; and n, 0.

The content of $R^2SiY_3$ in a second component of the silicone resin of the resin composition of the present invention is set to be 30 to 50 molar %. For less than 30 molar % of the second component, a cured resin composition layer formed on a transparent substrate becomes softened while, for the content of the second component exceeding 50 molar percent, a cured resin composition layer formed on the transparent substrate becomes hard and brittle. It is, therefore, not possible, in either case, to form a desired pit pattern on an optical disc substrate. The content of the second component is preferably in a range of 35 to 45 molar %.

In a chemical formula $R^2SiY_3$, $R^2$ is a phenyl group or a methyl group;

Y is a functional group selected from the group consisting of a halogen, isocyanate group and alkoxy group having below 6 carbon atoms.

A mixture of a compound whose $R^2$ is the phenyl group with a component whose $R^2$ is the methyl group may be used as $R^2SiY_3$. It is preferable, in this case, that the content of the compound whose $R^2$ is the phenyl group be at least 16 molar %. The reason is that, if the compound whose $R^2$ is the phenyl group is less than 16 molar %, the cured resin composition layer becomes brittle. Phenyltrichlorosilane is preferable where $R^2$ represents the phenyl group and Y represents a chlorine. The reason for this is as set out below. That is, a cured resin composition can retain a proper hardness originating from the use of phenyltrichlorosilane and the resin composition, coated on the transparent substrate and dryed, becomes tack-free. The content of the phenyltrichlorosilane is preferably in a range of 35 to 45 molar % in silicon resin.

A compound represented by the following formula I, which is a third component of the silicone resin in the resin composition of the present invention, is set to be 45 to 60 molar % in a siloxy unit. For less than 45 molar % of the third component, no ready mold releasability is obtained between that cured resin composition and a stamper and, upon the releasing of it from the mold, the cured resin composition is left unreleased on the projection spots of the stamper. For the content of the third component exceeding 60 molar %, the cured resin composition becomes softened and is deposited on the recesses of the stamper. In either case, an undesirable pit pattern is formed on the resin composition layer. The content of the third component is preferably in a range of 45 to 53 molar %.

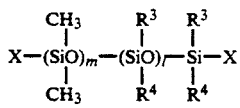

Formula I

In the chemical formula I, $R^3$, $R^4$ are a functional group selected from the group consisting of a methyl group, ethyl group, vinyl group, 1,3-dibutadienyl group, glycidoxy group, methacryloxy group and phenyl group;

X is a functional group selected from the group consisting of a halogen, hydroxy group, isocyanate group and alkoxy group having below 6 carbon atoms;

m is 4 to 100; and l is 0 to 10.

Here, α,ω-dichloropolysiloxane is preferable where $R^3$ and $R^4$ represent methyl group; X is chlorine; and m+l is 7 to 24.

As a curing catalyst in the resin composition of the present invention, use is made of an organic peroxide, such as benzoylperoxide, di-t-butylperoxide and dicumylperoxide. It is preferred that the content of the catalyst be in a range of 1 to 5 wt% based on the silicon resin. The reason is that, for less than 1 wt% of the catalyst based on the silicon resin it takes a longer time to cure the resin composition and, for the content of the catalyst exceeding 5 wt%, a cured resin composition layer obtained becomes too hard and produces cracks. The curing time of the resin composition can be controlled by adjusting an amount of curing catalyst to be added.

The resin composition of the present invention is obtained by the following way. First, the aforementioned three components are properly mixed to obtain a blend or the three components are solved, as required, in a solvent, such as toluene or xylene, which is inert to these components.

Then water adequate for hydrolysis is added to the blend or the solution to undergo hydrolysis and hence to obtain a silano compound. From the composition of silanes, alcohol, such as methanol, ethanol or propanol, is initially added, as an assistant hydrolyzing agent, to the blend or the solution.

After an acid produced through the hydrolysis has been washed with water, it is diluted with a solvent, such as toluene or xylene, to prepare a solution having an organopolysiloxane concentration of 5 to 70 wt% and preferably 20 to 50 wt%. The prepared solution is subjected to dehydrocondensation at an ordinary temperature through 160° C. For the organopolysiloxane concentration exceeding 70 wt%, the content in the solution is gelled before the hydroxyl group is decreased to an intended amount through the dehydrocondensation. For the organopolysiloxane concentration of less than 5%, it takes a longer time to the dehydrocondensation and not economical. In this case, a generated condensed water is eliminated out of an involved system under a mild condition involving no molecular rearrangement (no bond of some molecule to other molecules without dehydrocondensation), for example, at a reflux temperature of toluene in the case where the toluene is used as a solvent. In this way, the concentration, in the resin, of the hydroxyl group bonded to silicon is reduced below 0.1% by weight. As the catalyst for dehydrocondensation, use is made of a hydroxide of alkaline metal, such as sodium hydroxide, potassium hydroxide, cesium hydroxide, etc., exhibiting a strongly basic, a quarternary ammonium hydroxide compound, such as $(CH_3)_4NOH$, $(C_4H_9)_4NOH$, $(CH_3)_3C_6H_5CH_2NOH$, etc., and a quarternary phosphonium hydroxide compound, such as $(C_4H_9)_4CH_2POH$. It is preferable to add 0.01 to 1 wt% of the catalyst to the silanol compound. The reason is that, upon the addition of more than 1 wt% of the catalyst to the silanol compound, a siloxane bond in the silanol compound is broken.

Then the aforementioned catalyst is neutralized with, for example, a mineral acid such as hydrochloric, sulfuric or phosphoric, an organic acid, such as formic, acetic or propionic, or tricresylphosphate to deactivate it. The resultant salt is filtered off. The quarternary ammonium hydroxide compound or quarternary phosphonium hydroxide compound, if being used as the catalyst, is deactivated through thermal decomposition.

A resin composition of the present invention can be obtained by adding a curing catalyst to a silicone resin thus obtained.

Manufacturing an optical disc using the resin composition will be explained below.

FIG. 2 is a diagrammatic view showing an apparatus for manufacturing an optical disc substrate. In FIG. 2, reference numeral 20 shows an upper mold having a shaft 21 at the top and a heater 22 at a bottom. A plate 23 is attached to the bottom surface of the heater 22. A stamper 24 is attached to the bottom surface of a plate 23 and has projections and recesses at one surface which correspond to pits and grooves. That is, the stamper 24 is mounted on the plate 23 with said one surface down. A stamper support 25 is mounted on the plate 23 to support the stamper 24. The upper mold 20, heater 22, plate 23, stamper 24 and stamper support 25 can be moved, as one unit, in an up/down direction by the shaft 21.

A base plate 26 is disposed below the upper mold 20. An outer peripheral member 27 is provided as a hollow member on the surface of the base plate 26. The upper end surface of the outer peripheral member 27 is placed in contact with the lower end surface of the stamper support 25 with an 0-ring 28 inserted between the upper end surface of the member 27 and the lower end surface of the stamper support 25. A spacing 29 of the member 27 can be hermetically sealed, by the O-ring 28, between the member 27 and the stamper support 25. A substrate base 31 is provided, through bellows 30, over the base plate 26 with the spacing defined therebetween. A recess 32 is provided on the upper surface of the substrate base 31 and a heater 33 is mounted on the bottom surface of the substrate base 31. A transparent substrate 34 is arranged on the substrate base 31 with a resin composition of the present invention coated thereon.

A fluid introducing pipe 35 is mounted in the base plate 26 such that it is connected to a zone 36 surrounded with the bellows 30. A valve 37 is provided on the fluid introducing pipe 35. An inlet pipe 38 is connected to the spacing 29 and a leak valve 39 is mounted on the inlet pipe 38. A pipe 40 leads to the recess 32 through the center areas of the heater 22, plate 23 and stamper 24 and has a valve 41 mounted thereon. These pipes 35, 38 and 40 are connected together with the valves 37 and 41 set on a vacuum side to establish a vacuum in such a system by virtue of a vacuum means, not shown.

In the apparatus having such an arrangement as set out above, a fluid is introduced from the pipe 35 into the zone enclosed by the bellows 30. By so doing, the substrate base 31 is raised, causing the transparent substrate 34 to be brought into pressure contact with the stamper 24. Thus the transparent substrate 34 is uniformly pressed onto the stamper 24 and a projection/recess pattern on the surface of the stamper 24 can be securely transferred to the transparent substrate 34. It is, therefore, possible to adequately prevent the failure of the pattern to be transferred onto the transparent substrate due to the nonuniformed pressure contact of the transparent substrate with the stamper 24. It is also possible to prevent an ingress of air in the resin layer with the use of a vacuum in the system involved.

An optical disc is manufactured on the apparatus in the following way.

First, a resin composition of the present invention is coated onto the transparent substrate (for example, glass) 34 by a coating means, such as a spinner, to form a resin layer 5 to 100 μm in thickness. This step is followed by the drying of the resin layer.

The stamper 24 and substrate base 31 are heated by the heaters 22 and 33 to a temperature of 20° to 200° C. The valves 37 and 41 are set to the vacuum side. Then the upper mold 20, heater 22, plate 23, stamper 24 and stamper support 25 are lifted as one unit by the shaft 21 and the transparent substrate 34 is placed on the substrate base 31 with a resin layer coated thereon.

Then, the shaft 21 is downwardly moved, causing the stamper support 25 to abut against the upper end surface of the member 27 and a resultant inner spacing is set to below 15 Torr. With the valve 37 set to a pressure-applying side, air is blown into the bellows zone to press the substrate against the stamper at a pressure of 1 to 20 kg/cm$^2$, raising the substrate base 31 and bringing the transparent substrate 34 on the substrate base 31 into pressure contact with the stamper 24. As a pressure-applying medium, it is only necessary to use a fluid. For example, a liquid, such as water, may be used in place of air. In this state, the curing of the resin composition is accelerated for 0.5 to 5 minutes and the leak valve 39 is opened. With the valve 37 set to the vacuum side, the application of the pressure is stopped and the valve 41 is set to be on pressure-applying side, followed by the blowing of air under pressure and separation of the stamper 24 from the transparent substrate 34. Finally, the shaft 21 is moved upward and an optical disc substrate is picked up. The projection/recess pattern on the surface of the stamper 24 is transferred to the resin layer on the optical disc substrate, the pattern corresponding to pits to be formed.

Here, the manufacture of the stamper 24 will be explained below.

Figure 3A:
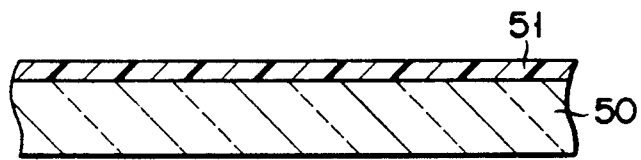

First, as shown in FIG. 3A, a photosensitive resist is uniformly coated on the surface of a substrate 50 to provide a resist layer 51. As a material for the substrate 50, glass, quartz, ceramics, etc., are selectively employed which can manufacture flat-surface substrate with high accuracy. The substrate 50 is preferably 1 mm or more in thickness from a standpoint of its handle and its strength. The thickness of the resist layer 51 is preferably about 1500 Å so as to avoid the occurrence of a defect spot, such as a pinhole and to be made commensurate with the height of a pregroove.

Figure 3B:
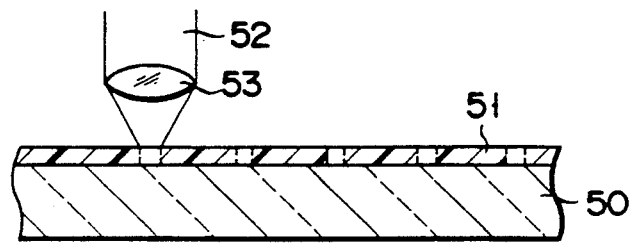
Figure 3C:
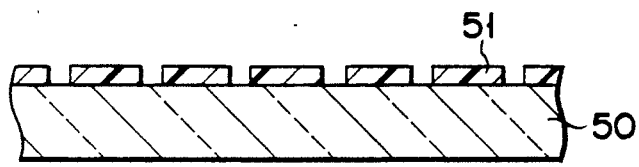

As shown in FIG. 3B, laser light 52 is directed through an objective lens 53 to the resist layer 51 at an area corresponding to a pregroove to be formed. The light-illuminated area of the resist layer is removed through a development to form a pattern (FIG. 3C). The patterning step may be utilized a photolithography method using a photo mask.

Figure 3D:
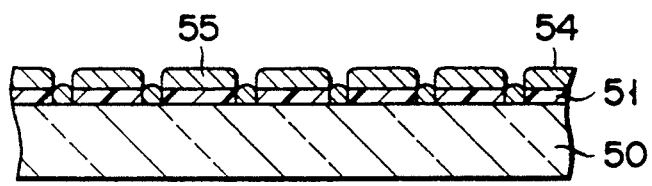

As shown in FIG. 3D, a thin metal layer 54 is formed on the whole surface of the substrate 50 on which the patterned resist layer 51 has been formed. As a metal material for the thin metal layer, it is preferable to use chromium or titanium exhibiting an excellent adhesion to the material used as the substrate. The thickness of the thin metal layer 54 is preferably of the order of $\lambda/8$, that is, 500 to 750 Å, in view of its relation to the wavelength $\lambda$ of laser light at a time of reading out information. The metal thin film 54 is formed by a sputtering or vapor deposition.

Figure 3E:
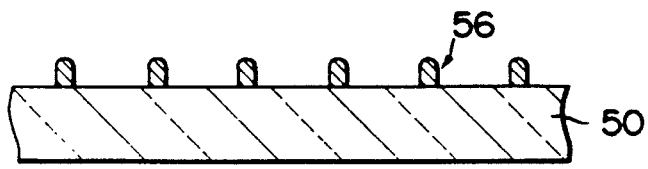

As shown in FIG. 3E, the resist layer 51 and thin metal layer 54 formed thereon are removed by a lift-off method to form a pregroove pattern on the substrate 50. The resist layer 51 is removed by immersing an organic solvent, such as acetone. In this way, a first pattern corresponding to a pregroove for tracking servo is provided on the substrate 50.

Then a photosensitive resist is again coated uniformly on the surface of the resultant substrate to provide a resist layer 57 over the substrate as shown in FIG. 3F. The thickness of the resist layer 57 is preferably 3000 Å so as to be made commensurate with the height of a prepit for address information.

Laser light 58 is directed through an object lens 59 onto the resist layer 57 at an area corresponding to the prepit, while performing position control with the first pattern of the pregroove as a guide groove. Then the resist layer corresponding to the light-illuminated area is removed through a development to form a pattern (FIG. 3G). The patterning step may be carried out by a photolithography method using a photo-mask.

Then a thin metal layer 60 is provided on the resultant substrate as shown in FIG. 3H. As a metal material for the thin metal layer, it is preferable to use chromium or titanium exhibiting an excellent adhesion to the material used as the substrate. The thickness of the thin metal layer 60 is preferably on the order of $\lambda/4$, that is, 1000 to 1500 Å in view of its relation to the wavelength $\lambda$ of the laser light at a time of reading out information. The thin metal film 54 is formed by a sputtering or vapor deposition.

Then, as shown in FIG. 3I, the resist layer 57 and thin metal layer 60 formed thereon are removed by lift-off method to form a prepit pattern 61 on the substrate 50. The removal of the resist layer 57 is accomplished by immersing the substrate in an organic solvent, such as acetone. In this way, a second pattern is formed on the substrate such that it corresponds to a prepit for address information. It is thus possible to provide a stamper for an optical disc on which the first and second patterns are formed. When the height of a prepit pattern is the same as that of a pregroove pattern, the second pattern is not required.

It is preferable to initially treat the surface of a stamper with a silazane compound so as to effect smooth separation between the stamper for the optical disc and resin layer formed on the transparent substrate. As the silazane compound, use is made of hexamethyldisilazane, N-trimethylsilylacetamide, dimethylditrimethylsilylamine, diethyltrimethylsilylamine, trimethylsilylimidazole, etc. The surface treatment may be carried out using a vapor from the silazane compound or a silazane compound solution. It is preferable, in particular, to subject the stamper to the treatment using a vapor.

For example, the vapor treatment of the silazane compound is accomplished by placing a stamper in a glass or a stainless container in coexistence with a silazane compound, heating the container in, for example, an oven at a temperature of about 100° to 250° C. and maintaining this state for 5 minutes or more. The treatment can be carried out above an ordinary temperature, but it is not preferable to do so at a relatively low temperature because it takes a longer time to the treatment. For the treatment temperature of 250° C. or more, some trouble occurs upon handling, resulting in lowered production efficiency. Further, the treatment capacity of the silazane compound in the form of vapor is usually 300 to 400 m²/g and an amount of it used each time is about 0.1 g/l, a value which is very small. This is very economical. The treatment using the silazane may be done once after the manufacture of a stamper but before the use of the stamper for molding.

Finally, a recording layer is formed over the aforementioned optical disc substrate by a customarily used means, such as sputtering. In order to enhance the recording sensitivity of the optical disc, it may be possible to provide an underlying layer over the substrate, or a reflective layer beneath the recording layer, as the necessity arises. In order to protect the recording layer, a protective layer is provided over the recording layer. In this way, an optical disc of the present invention is manufactured.

In order to enhance an adhesion between the transparent substrate and a layer formed of a resin composition of the present invention, the transparent substrate is preferably treated by a silane coupling agent represented by, for example, $R^1(CH_2)_nSiX_3$ where $R^1$: a functional group selected from the group consisting of vinyl group, 1,3-dibutadienyl group, glycidoxy group and metacryloxy group;

X : a functional group selected from the group consisting of a halogen, isocyanate group and alkoxy group having 6 carbon atoms or below; and n : 0 to 5

In this case, the treatment of the transparent substrate by the silane coupling agent may be effected using the silane coupling agent in the form of a vapor or a solution of the silane coupling agent.

The present invention will be explained below in connection with Examples so as to confirm the effects of the present invention.

EXAMPLE 1

642 g of phenyltrichlorosilane, 125 g of vinyltriethoxysilane and 233 g of α,ω-dichloropolysiloxane (average degree of polymerization m=15) were mixed to prepare a blend.

The blend was dissolved into 500 g of toluene to prepare a toluene solution. The toluene solution was added, dropwise, to a mixed solution of 1000 g of toluene and 1500 g of water for 15 minutes to allow it to be subjected to hydrolysis. The resultant solution was allowed to stand, separating a toluene fraction from it and eliminating another fraction. The toluene fraction was washed to eliminate the acid in the toluene fraction. Then 0.05 wt% of potassium hydroxide was added to the washed toluene fraction based on the solids content of the fraction and a resultant fraction was heated for one hour at 110° C., that is, at a reflux temperature of the toluene to obtain an organopolysiloxane solution having below 0.1 wt% of a hydroxyl group. At that time, a condensate produced upon hydrolysis was removed from system involved in reflux. The resultant organosiloxane solution was neutralized with an acetic acid and excess toluene was removed in the form of a concentrated one. The solution was filtered to remove a produced salt and to obtain 55 wt% of a nonvolatile fraction in the organo-polysiloxane solution. To this solution, 2.5 wt% of dicumylperoxide was added based on the nonvolatile fraction to obtain a resin composition.

On the other hand, a 3.5 inch-diameter optical disc glass substrate was treated in a 0.1 g/l-vinyltriethoxysilane vapor at 150° C. for 150 minutes. The resin composition obtained was coated by a spinner on the surface of the treated glass substrate. The glass substrate was dried at 100° C. for 10 minutes to prepare a substrate having a resin composition layer whose average thickness was 10 μm.

The substrate thus obtained was placed on the substrate base of the apparatus shown in FIG. 2. After the inside of the apparatus was pressure-reduced below 15 Torr, air was blown into the inside of the apparatus and the substrate base was lifted, causing the resin layer on the substrate to be pressed against the stamper at a pressure of 5 kg/cm². This state was held for one minute and a pit pattern of the stamper was transferred to the resin composition layer while the curing of the resin composition was accelerated. Then an ordinary pressure was regained in the apparatus and the substrate was removed from the apparatus. In this way, 100 substrates was prepared.

The 100 substrates was checked for a defect in its transferred pit pattern, a presence of air bubbles in the resin composition layer and a damage in the resin composition layer, the result of which is shown in Table 1 together with Controls.

TABLE 1

| | Mixed ratio g (molar percent) | | | Defect in resin composition layer |
|---|---|---|---|---|
| | Phenyltrichlorosilane | Vinyltriethoxysilane | α,ω-dichlorpolysiloxane | |
| Example 1 | 642(44.6) | 125(9.7) | 233(45.7) | 0/100 |
| Example 2 | 611(40.7) | 125(9.3) | 266(50.1) | 0/100 |
| Example 3 | 575(36.8) | 125(8.9) | 300(54.3) | 0/100 |
| Example 4 | 542(33.4) | 125(8.6) | 333(58.0) | 1/100 |
| Example 5 | 633(43.9) | 135(10.4) | 233(45.7) | 0/100 |
| Example 6 | 594(39.6) | 140(10.4) | 266(50.1) | 0/100 |
| Example 7 | 553(35.3) | 146(10.4) | 301(54.3) | 0/100 |
| Example 8 | 514(31.6) | 152(10.4) | 334(58.0) | 1/100 |
| Example 9 | 581(36.0) | 133(14.0) | 285(50.0) | 0/100 |
| Example 10 | 564(34.0) | 118(12.0) | 317(54.0) | 0/100 |
| Example 11 | 534(31.0) | 108(11.0) | 354(58.0) | 0/100 |
| Control 1 | 675(48.6) | 125(10.4) | 200(41.0) | 21/100 |
| Control 2 | 475(27.2) | 125(8.0) | 400(64.8) | 100/100 |
| Control 3 | 425(23.8) | 162(10.4) | 409(64.8) | 100/100 |
| Control 4 | 590(39.0) | 147(16.0) | 247(45.0) | 17/100 |

A recording layer was formed on each of all those substrates found free of defects to prepare an optical disc. The optical disc was subjected to a temperature cycle test at a cycle of 95° C., 80% RH for 8 hours and −20° C. for 8 hours. As a result, all the tested optical discs have been found free of defects and damages.

EXAMPLES 2 TO 11 TO CONTROLS 1 TO 4

Resin compositions were obtained as in Example 1 except that a mixed ratio of phenyltrichlorosilane, vinyltriethoxysilane and α, ω-dichloropolysiloxane was as shown in table 1.

Then these resin compositions were coated on the substrate as in Example 1 and a pit pattern of the stamper was transferred to the resin composition layer. 100 substrates thus obtained were checked for a defect in its pit pattern transferred, a presence of air bubbles in the resin composition layer and a damage in the resin composition layer as in Example 1, the result of which is as shown in Table 1.

A recording layer was formed on each of all those substrates found free of defects to prepare an optical disc. The respective optical disc was subjected to a temperature cycle test at a cycle of 95° C., 80% RH for 8 hours and −20° C. for 8 hours.

As evident from Table 1, those optical disc substrates (Examples 1 to 11) obtained using the resin composition of the present invention were found not defective. Many of the optical disc substrates (Controls 1 to 4) using a resin composition whose mixed ratio was beyond a range of the present invention were found defective.

As already set out above, the substrate thus obtained using the resin composition of the present invention can prevent occurrence of a wrinkle or crack on its recording layer formed thereon. The resultant optical disc can exhibit an excellent optical characteristic.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical disc comprising:
   a transparent substrate;
   a resin composition layer formed on the transparent substrate, which resin composition layer provides the surface of the transparent substrater with a projection/recess pattern; and
   a recording layer formed on the resin composition layer;
   wherein the resin composition layer is comprised of:
   (A) a silicone resin consisting of:
   5 to 15 molar percent of a first component represented by the chemical formula:

$$R^1(CH_2)_nSiX_3$$

wherein, $R^1$: a functional group selected from the group consisting of a vinyl group, 1,3-dibutadienyl group, glycidoxy group and methacryloxy group;

X: a functional group selected from the group consisting of a halogen, hydroxyl group, isocyanate group and alkoxy group having below 6 carbon atoms; and n: 0 to 5;

30 to 50 molar percent of a second component represented by the chemical formula:

$$R^2SiY_3$$

wherein, $R^2$: a phenyl group or a methyl group; and

Y: a functional group selected form the group consisting of a halogen, isocyanate group and alkoxy group having below 6 carbon atoms, and 45 to 60 molar percent in a siloxy unit of the third component represented:

$$X-\underset{\underset{CH_3}{|}}{\overset{\overset{CH_3}{|}}{(SiO)_m}}-\underset{\underset{R^4}{|}}{\overset{\overset{R^3}{|}}{(SiO)_l}}-\underset{\underset{R^4}{|}}{\overset{\overset{R^3}{|}}{Si}}-X$$

wherein, $R^3$, $R^4$: a functional group selected from the group consisting of a methyl group, ethyl group, vinyl group, 1,3-dibutadienyl group, glycidoxy group, methacryloxy group and phenyl group;

X: a functional group selected from the group consisting of halogen, hydroxy group, isocyanate group and alkoxy group having below 6 carbon atoms.

m: 4 to 100; and l: 0 to 10; and (B) a curing catalyst.

2. The optical disc according to claim 1, wherein an underlying layer is formed between said resin composition layer and said recording layer.

3. The optical disc according to claim 1, wherein said first component is vinyltrichloroethoxysilane.

4. The optical disc according to claim 3, wherein said first component is comprised of vinyltriethoxysilane and the content of said first component is 9 to 12 molar %.

5. The optical disc according to claim 1, wherein said second component is phenyltrichlorosilane.

6. The optical disc according to claim 5, wherein said second component is comprised of phenyltrichlorosilane and the content of said second component is 35 to 45 molar %.

7. The optical disc according to claim 1, wherein said third component is comprised of α,ω-dichloropolysiloxane.

8. The optical disc according to claim 7, wherein said third component is comprised of α,ω-dichloropolysiloxane and the content of said third component is 45 to 53 molar %.

* * * * *